3,075,380
MEANS FOR DETECTING AND LOCALIZING OIL LEAKAGES IN ELECTRIC CABLES
Enrico Sesini and Mario Pierazzuoli, Milan, Italy, assignors to Pirelli Società per Azioni, Milan, Italy
Filed Jan. 19, 1956, Ser. No. 560,257
Claims priority, application Italy Jan. 24, 1955
9 Claims. (Cl. 73—40.5)

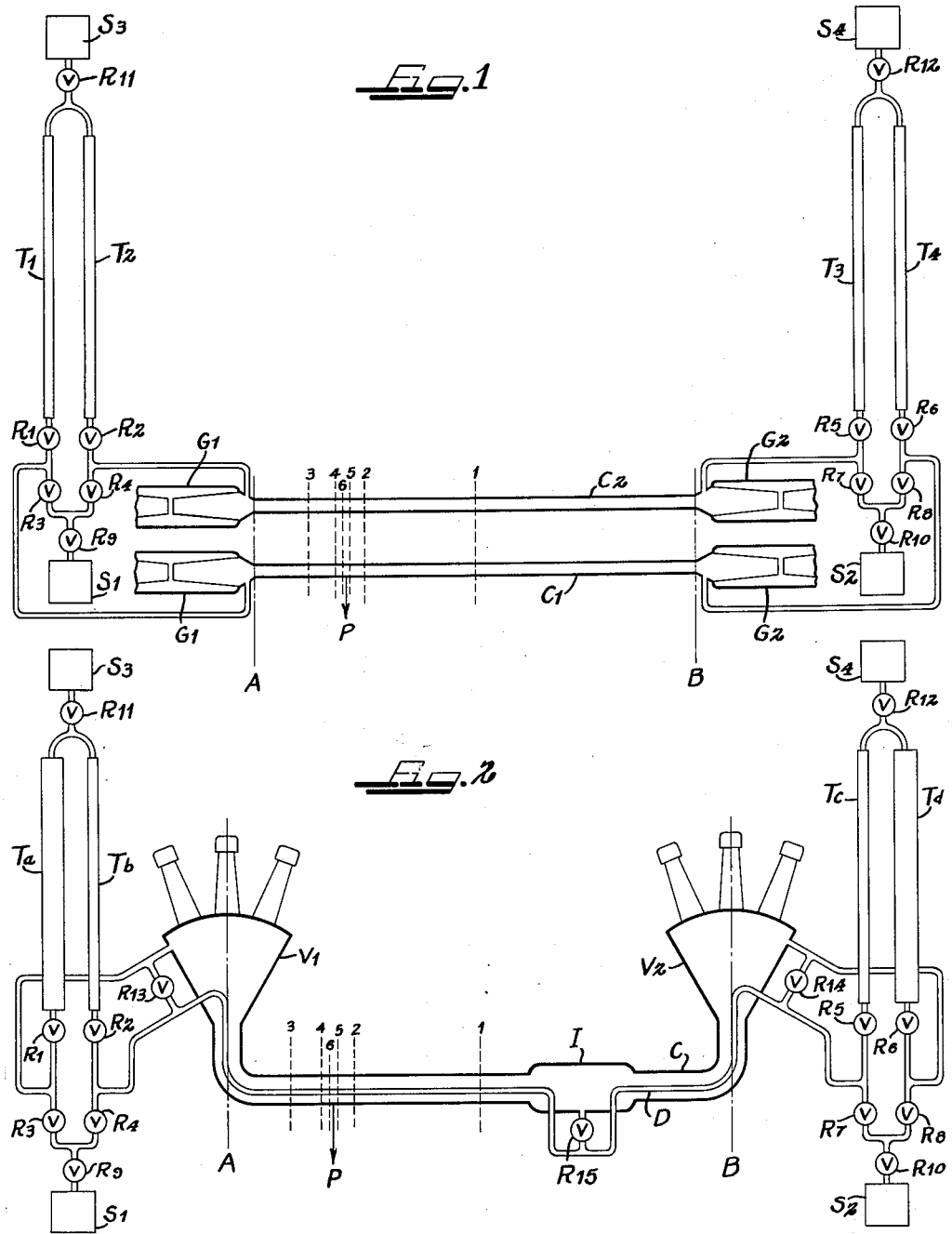

This invention relates to the detection and localization of oil leakages occurring through the lead sheath of an oil filled electric cable. The principles of the present invention are applicable either to a three-core cable or to a cable of a system wherein several single-core cables are laid parallel and near to each other.

It is common practice to provide oil filled electric cables with stop joints which subdivide the cable into longitudinally consecutive sections and stop the longitudinal passage of oil between consecutive sections while at the same time assuring electrical continuity of the conductor. By suitable means the stop joints may allow communication of the oil in its associated section of the cable with the exterior of the cable sheath.

The problem of detecting and localizing an oil leak through a fault in the lead sheath of an oil filled cable has often proved difficult. Methods which seek to locate an oil leak by measuring the volume of oil flowing from the oil reservoir into the cable are bound to entail certain difficulties due to the fact that the oil flow which necessarily results from expansion and contraction caused by thermal changes may be many times the rate of oil flow caused by leakage. For instance, a leak of one hundredth of a cubic centimeter per second will in one year give a loss of about 300 litres. This loss of a fraction of a litre per day is quite small in comparison with the flows usually originated by thermal variations, said loss of 300 litres being equivalent, in a line 1 km. long, to the flow corresponding to a thermal expansion of the oil, uniform in the course of time, of only one centigrade degree over a period of two days.

When the leak is very small in comparison with the amount of oil contained in a single-core cable being examined, and consequently with the flow resulting from inherent thermal expansion, it is desirable to use other methods for determining the presence and location of an oil leak.

It is one of the objects of the present invention to provide an improved method of and means for sectionalizing a line of oil filled cable to facilitate testing for the existence and location of an oil leak. In accordance with the principles of the present invention, recourse is made to sectionalizing the line by freezing the oil at an intermediate point of the cable and thereby producing the equivalent of an oil stop joint at that location. The freezing may be accomplished by using dry ice, or liquid air, by way of example. For test purposes, the cable section may first be frozen at its middle point to determine in which half the leak exists. This half is again frozen at its middle point (that is, at a quarter of a section length of cable) to determine which is the leaking quarter, continuing in this way, after a few subsequent freezing operations, the location of the leak is ascertained to be in a length of cable sufficiently short for inspection through its length to find the fault.

The freezing method hereinabove set forth, when suitably carried out, causes no injury to the cable and may be applied with a minimum of trouble.

The principles of the present invention can be applied with great simplicity in an installation where the impaired cable is located adjacent and parallel to a continuous conduit of the same length and filled with oil having at any time the same temperature as the oil in the cable, and subjected to the same ambient temperature condition. In the case of a system employing three oil filled single-core cables laid parallel and near to one another (as in the case of three single-conductor cables of a three phase line), any one of the non-impaired cable lengths may be utilized, in accordance with the present invention, in conjunction with the impaired cable, for ascertaining the location of the fault in the impaired cable. In such case, in accordance with the principles of the present invention, it is advisable to freeze the impaired and the unimpaired cable lengths and then the above described method may be followed. Adjacent ends of the two cable lengths are connected to two equal manometric tubes and the oil in the two cables is then subjected to equal pressure which may be the same as or higher than atmospheric pressure, which pressure is maintained for a short period of time. Thermal changes, if any, that may occur in the two cables will be identical and will produce identical changes in the oil level in the two manometric tubes. On the other hand, in the case of that cable which is faulty, the leakage of oil through the fault in the cable will cause a drop in its associated manometric tube with respect to the other manometric tube. In this condition it is not a matter of measuring the small difference between a large volume of oil flowing in one cable and a large volume of oil flowing in the other cable and evaluating them with a degree of accuracy required for localizing a fault, but rather, it is simply a matter of ascertaining the existence of a difference in level in the two manometric tubes, which difference is not influenced by simultaneous temperature variations of the oil in the two cable sections. This difference indicates the existence of a fault in the cable sheath between the manometric tube and the frozen section.

The principles of the present invention are also applicable where the problem consists in localizing a fault in a single three-core oil filled cable where there is no possibility of using a second equal and sound cable as a temperature comparison device, that is, where the second cable reveals the volumetric changes due to thermal changes, as distinguished from volumetric changes due to leakage. However, if there were a continuous, adjacent and parallel conduit of the same length as the impaired cable, and filled with oil having at any time the same temperature as the oil of the cable, the above-mentioned method would be still applicable. It is to be noted that in a three-core cable, generally the oil flows longitudinally through three channels each of which consists of a wire or a metallic strip wound as an open helix, the channels being embedded in the fillers which fill the interstices between the cable cores, said channels helping to carry the oil and to spread it over the insulation over the whole length of the line. It is possible to replace one of said open channels with a continuous metallic conduit, for instance, a copper or lead tube, which connects the joints and sealing ends of the cable and feeds them directly with oil.

It is therefore an object of the present invention to provide a method of and means for locating the point where there is a leakage of oil through a fault in the lead sheath of an oil-filled electric cable by the simple ascertainment, after a short period of time, of a difference in level of the oil filling two manometric tubes, said examination being carried out after each of successive freezing operations at different points of the line, each freezing operation being carried out both as to the oil contained in the impaired cable and as to the oil contained in a continuous sound conduit parallel and adjacent to the cable itself.

When the impaired cable forms part of a system of several single core cables, the sound conduit may be a cable of the same system adjacent to and having the same length as the impaired cable, said sound cable being used as a means of temperature comparison and acts in effect as a temperature comparison device.

When the impaired cable forms part of a line of a single three-core cable, the above-mentioned conduit is a continuous metallic tube embedded into the fillers of the cable. This tube directly feeds the joints and sealing ends of the cable with oil and may act as a temperature comparison device in the testing above referred to. In fact, in proximity to said cable accessories, an arrangement can be provided by which the oil supplied to the accessories themselves may, if necessary, be interrupted without opening them, for instance, by means of suitable valves, thus obtaining a continuous conduit which extends from one end of the cable section to the other and which has no communication with the cable itself other than through suitable external valves. This conduit, in which the oil has evidently the same temperature as the oil of the cable, may serve as a second cable acting as a temperature comparison device for the detection of the leaking length by applying the above described method, to which some modification is, however, to be made.

The attainment of the above and further objects of the present invention will be apparent from the following specification taken in conjunction with the accompanying drawings forming a part thereof.

In the drawings:

FIG. 1 indicates, schematically and not to scale, the applications of the present method to a system having several substantially identical single-core, oil filled cables; and FIG. 2 schematically represents the applications of the principles of the present invention to a cable system embodying a single three-core oil filled cable.

In the accompanying drawings like reference numerals designate like parts throughout.

Assume that it is desired to find the location of a leak in the sheath of a cable C1 that is one of several single-core, oil filled cables, parallel and adjacent to one another, of which the sound cable C2 is one. The tests hereinafter described for locating an oil leak are carried out when the cable is not carrying current nor under voltage, and at a time when the cable temperature is, as nearly as possible, the same as that of the surrounding ground (many hours after the cable has been at no load, and preferably at a time of the day when ambient temperature changes are minimum). Assume that the fault is in a section of cable A—B at a point P of unknown location between two successive stop joints G1 and G2 of the two cables. Both cable sections C1 and C2 are limited by their consecutive stop joints.

In accordance with the principles of the present invention, the two cable sections C1 and C2 are respectively connected at their ends A and B with manometric tubes T1, T2, T3 and T4, the manometric tubes T1 and T2 at one end being of the same diameter, and T3 and T4 of the same diameter at the other end. The connection is through valves or stop cocks R1, R2, R5 and R6 placed in the pipes which communicate with the respective stop joints G1 at one end and G2 at the other end. Oil feeding tanks S1 and S2, containing oil under pressure, are also connected to the joints G1 and G2, these connections being through valves or stop cocks R3, R4, R7, R8, R9 and R10.

The tops of the pair of tubes T1 and T2 are connected together and, through a valve or stop cock R11, are connected to a tank S3, and the tops of the tubes T3 and T4 are likewise connected together and, through a valve or stop cock R12, are connected to a tank S4. The tanks S3 and S4 are filled with compressed inert gas and arranged in such a way as to maintain within each pair of tubes a gas pressure which is constant and equal to that existing in the feeding tanks S1 and S2 during the inspection of the oil level.

By means of this arrangement, the cocks R1, R2, R5, R6, R11 and R12 being closed, the two sections may be supplied with oil through the feeding tanks S1 and S2. Upon opening of the cocks R1, R2, R5 and R6 the oil will rise inside the manometric tubes and compress the air therein contained until a level of equilibrium is reached inside of the tubes T1 and T2, which level will be the same, and another level, also equal, is reached in the tubes T3 and T4. The cocks R11 and R12 are then opened, thus establishing communication with the compressed gas containers S3 and S4. The two sections are then frozen, for instance, at point 1 midway between ends A and B. When the freezing has been accomplished the cocks R3, R4, R7 and R8 are closed. The volume variations of the oil in the sections C1 and C2 due to thermal changes act in such a manner that, if no leak exists, the level of the oil in the tubes T1 and T2 will fluctuate in the same manner so that the oil level in the tube T1 remains equal to the oil level in the tube T2. Likewise, fluctuation of the oil level in the tube T3 will be the same as in the tube T4 so that the oil levels in those two tubes will remain equal (if no leak exists between B and the freezing point 1). If, however, an oil leak exists in the cable length C1 at some point P, not ascertained, between A and the freezing point 1, the presence of such leak may be ascertained by the fact that the oil level in the tube T1 is continuously decreasing in comparison with the oil level in the tube T2. Even in the case of a very small leak, the difference in the level in the tubes T1 and T2 will become evident, since the examination may be extended for a longer period of time. On the contrary, in the tube T3 the oil will be maintained at the same level as in the tube T4, as it is assumed that no oil leak exists in the cable section between B and the freezing point 1.

Once it is determined that the fault is in the length A–1, its localization can be carried out by the following method: After the freezing operation at the point 1, the oil is again brought to an equal level in the tubes T1 and T2 and to an equal level in the tubes T3 and T4 in the same manner as heretofore explained, and the freezing of both cables C1 and C2 is repeated at a point 2 midway between the point A and the point 1, and the same test is again repeated. This test will indicate that the leak is between A and 2. The identical test is then repeated by freezing both cables C1—C2 at the point 3. This test now indicates that there is no leak in the cable C1 between the point A and the point 3. In the light of the previous tests, it follows that a leak in the cable C1 must exist between the freezing point 3 and the former freezing point 2. After thawing of the frozen portion of the cable at 3, the test is repeated by freezing the cables C1 and C2 at the point 4, midway between the former freezing points 2 and 3. It is thus ascertained that the leak does not exist between the points A and 4 from which it follows that the leak is between the point 4 and point 2. Subsequent successive freezings, each accompanied by a testing, are performed at the point 5 and then at the point 6, in each case at the mid point of the minimum length in which the fault occurs, as indicated by the previous tests. Thus, it is finally ascertained that the fault is in the length between 5 and 6, which is of such limited size as to permit examination of the cable throughout that length 5—6 to localize the position of the fault.

FIG. 2 schematically represents, also by way of non-limiting example, the application of the principles of the present invention to a single oil filled cable having three separate insulated cable conductors enclosed in a lead sheath which is filled with oil under pressure. Such conventional cables have a plurality of parallel oil channels or ducts therein, each oil duct or channel generally consisting of a tube formed of a metallic strip wound as an open helix and embedded into the fillers which fill the interstices between the insulated cable cores within the sheath and help to spread oil over the insulation for the whole length of the line. In the case of a three-conductor cable, it is one common practice to provide three such ducts or channels. The cable C of FIG. 2 is, in general, such a cable and differs therefrom only in that one of said ducts or channels is replaced by a continuous imperforate metallic conduit D, for instance, a copper or lead tube. This tube is embedded in the fillers of the cable, between the insulated cable cores. This tube extends outside of the cable at certain of the accessories such as, for instance, at the sealing ends V1 and V2 which may comprise terminators or potheads, and one or more intermediate normal joints I. The accessories V1, V2, and I are connected to feed oil into the cable through external valves such as the valves R13, R14 and R15 by which the tube D may be permitted to or stopped from feeding oil to the accessories V1 and V2 and I. The cable C which extends between the sealing ends or potheads V1 and V2 through one or more intermediate joints I is maintained filled with oil under pressure, the potheads V1 and V2 maintaining a fluid-tight oil seal while permitting at each end the emergence of electrical connections from each of the three cable conductors or cores within the cable sheath. In the normal operation of the cable the oil is maintained therein under pressure either through the duct D or through the internal channels each of which is formed by an open helix embedded in the cable, as previously described, or through both the channels and the tube D.

The tube D may be completely isolated from its function of feeding oil to the cable by closing the cocks R13, R14 and R15, thus obtaining a continuous conduit D extending from one end of the cable section to the opposite end thereof wherein the oil is subjected to the same thermal variations as the oil in the cable. In this case, manometric tubes $T_a$ and $T_d$ are of different diameters than the diameters of the manometric tubes $T_b$ and $T_c$. The internal diameters of the respective manometric tubes are proportional to the known volumes of oil respectively contained in the cable C and in the tube D. Since there is a greater volume of oil in the cable C than in the tube D, the manometric tubes $T_a$ and $T_d$ are of larger internal diameters than are the manometric tubes $T_b$ and $T_c$.

The connection of the manometric tubes and of the feeding tanks S1 and S2 to the cable C and to the tube D is carried out in the same manner as previously described in FIG. 1. According to this arrangement the cocks R1, R2, R5, R6, R11, R12, R13, R14 and R15 being closed, it is possible to feed oil to both the cable C and the tube D in parallel by means of the oil feeding tanks S1 and S2.

In order to locate an oil leak in the lead sheath of the cable, the leak being located at some point P of unknown position, the cocks R1, R2, R5 and R6 are opened (the cocks R3, R4, R7, R8, R9, and R10 being open) so that oil will rise to an equal height in the tubes $T_a$ and $T_b$ and to another height equal in the tubes $T_c$ and $T_d$. The cocks R3, R4, R7 and R8 are then closed and the cocks R11 and R12 are opened in order to establish communication with the containers S3 and S4 of compressed gas. Then the process described in connection with FIG. 1 is repeated, the cable being successively frozen at the points 1, 2, 3, 4, 5 and 6 and tests performed as previously described to determine, in each case, if a difference in level is established in each pair of tubes $T_a$—$T_b$ and $T_c$—$T_d$ and thus the leak point P is located in the length of cable 5—6 sufficiently short to permit it to be examined throughout its length to find the precise location of the fault.

In the construction of the three-core cable of FIG. 2 which incorporates the continuous imperforate metallic tube D, the placing of said tube in connection with the various joints and of the sealing ends of the line, and the means employed, if necessary, for completely isolating the oil duct of said tube from said cable and thus interrupting the oil supply to said accessories are all illustrated, by way of non-limiting example, in FIG. 2 and could therefore have a different practical development without departing from the scope of the present invention.

In the case where two or more oil leaks occur in the same cable section between A and B, illustrated in FIGS. 1 or 2, the way to operate to locate the faults may be substantially as described above. In fact, by a sequence of a few subsequent freezing operations it is possible to locate the oil leaks one after the other beginning from one end A or B of the section and moving forward to the other, taking care to repair each leak immediately after it is located. For instance, to begin with, localization is made of the fault nearer to the end A and once it is repaired the subsequent fault is located and repaired, etc., moving toward the end B.

In compliance with the requirements of the patent statutes there have herein been shown and described a few preferred embodiments of the present invention. It is, however, to be understood that the invention is not limited to the precise arrangements herein shown and described, the same being merely illustrative of the principles of the invention. What are considered new and desired to be secured by Letters Patent are:

1. A method of locating oil leaks even of very small magnitudes occurring through a fault or faults in the sheath of an oil-filled electric cable which is in a system wherein there is means forming an oil-filled member not subject to the same fault or faults and located in such relation to the cable as to be subject to the same thermal variations of the oil in the cable, which method comprises, providing manometric tubes of relative cross-sectional areas of the same ratio as the ratio of the quantities of oil contained in the cable and the member respectively, connecting the manometric tubes in communication respectively with the oil in the impaired cable and with the oil in the member, the connection being such that the ratio of the cross-sectional area of the cable-connected manometric tube to that of the other manometric tube is the same as the ratio of the quantity of oil contained in the cable to the quantity of oil contained in the member so that thermal variations produce identical variations in the oil level in the two manometric tubes, carrying out successive sectionalizing operations by simultaneously freezing of the oil of the cable and the oil of the member at corresponding intermediate points of the cable and the member, and during a part of each sectionalizing operation equalizing the oil levels in the respective manometric tubes so that any subsequent establishment of a differential in the oil levels in the manometric tubes while both the cable and the member remain frozen at an intermediate point indicates and is caused by a leak in the part of the cable sheath between the manometric tubes and the frozen intermediate point.

2. A method for localization of the point at which oil leaks through a fault in the sheath of an electric cable belonging to a system of at least two oil-filled single-core cables which are subject to the same thermal changes, which method comprises connecting to the faulty cable and to the other cable equal manometric tubes which are adjacent to one another, performing successive sectionalizing operations by simultaneously freezing the two cables at the same intermediate points of their length, and bringing the oil to the same level inside said manometric tubes between successive sectionalizing operations; whereby, after a sufficiently short period of time after the oil has been brought to the same level in said manometric tubes, the possible existence of a difference in level is an indication of the direction from the freezing point to the fault, so that after a few sectionalizing operations a length of cable is detected of such a small size as to be examined throughout to determine the exact location of the fault.

3. A method for localization of an oil leak of even very small magnitude through a fault in the sheath of an oil-filled electric cable having a continuously extending cable oil feeding tube subject to the same thermal changes, which method comprises connecting a manometric tube in oil flow communication to the faulty cable exclusive of the oil feeding tube, and connecting a second manometric tube in oil flow communication to the oil feeding tube, the ratio of the cross-sectional areas of the manometric tube connected to the cable to that of the manometric tube connected to the oil feeding tube being the same as the ratio of the quantity of oil contained in the cable exclusive of the oil feeding tube to that in the oil feeding tube so that thermal variations produce identical variations in the oil levels of the two manometric tubes, performing successive sectionalizing operations by simultaneously freezing the cable and the oil feeding tube at the same intermediate points of their length, and bringing the oil to the same level inside the manometric tubes between successive sectionalizing operations; whereby, after a sufficiently short period of time after the oil has been brought to the same level in the manometric tubes, the possible existence of a difference in level in the manometric tubes is an indication of the direction from the freezing point to the fault, so that after a few sectionalizing operations a length of cable is detected of such size to be examined throughout to determine the exact location of the fault.

4. The method of locating an oil leak through a fault in the sheath of an oil-filled electric cable where there is an oil-filled member that is adjacent to the cable and subject to the same thermal changes and can be used as a temperature change comparison device, which method comprises connecting separate manometric tubes to the opposite ends of a section of the cable and in oil flow communication therewith, connecting separate manometric tubes in oil flow communication with the opposite ends of a corresponding and adjacent section of the comparison device, which second tubes are respectively adjacent to the first-mentioned manometric tubes to provide two pairs of manometric tubes with the two tubes of each pair being connected to adjacent ends of the cable section and comparison device section respectively, the ratio of the cross-sectional area of the manometric tube connected to each end of the cable section to the cross-sectional area of the manometric tube connected to each corresponding end of the comparison device being the same as the ratio of the quantity of oil contained in the cable to that in the comparison device, establishing the same oil level in the two manometric tubes of each pair, maintaining identical pressure on the oil in the manometric tubes of each pair, and freezing the oil in the cable and the oil in the comparison device at corresponding intermediate points in the cable and in the device, whereby oil leakage in the cable will cause a relative difference in level of oil in the two manometric tubes of one pair thereby indicating the direction to the oil leak from the place of freezing of the cable.

5. A method of locating oil leaks even of very small magnitudes occurring through a fault or faults in the sheath of an oil-filled electric cable which is in a system wherein there is means forming an oil-filled member not subject to the same fault or faults and located in such relation to the cable as to be subject to the same thermal variations of the oil in the cable, which method comprises, providing first and second manometric tubes of relative cross-sectional areas of the same ratio as the ratio of the thermally caused oil flows in the cable and member respectively, connecting one end of the first and second manometric tubes in oil-flow communication with the oil in the impaired cable and with the oil in the member respectively and connecting the opposite ends of the tubes together to maintain equality of pressure on the oil in the tubes so that thermal variations produce identical variations in the oil level in the two manometric tubes, establishing the same oil level in the two manometric tubes, and freezing the oil in the cable and member at corresponding intermediate points, whereby the establishment of a drop in oil level in the first manometric tube with respect to the oil level in the second manometric tube results from the oil leak in the cable sheath and indicates the direction to the oil leak from the place of freezing of the cable.

6. The method of locating an oil leak through a fault in the sheath of an oil-filled electric cable where there is a second oil-filled cable that is parallel to the first cable and subject to the same thermal changes and can be used as a temperature change comparison device, which method comprises connecting a manometric tube in oil-flow communication with a section of the first cable, connecting a second manometric tube in oil-flow communication with a corresponding and adjacent section of the second cable, establishing the same oil level in the two manometric tubes and maintaining the same pressure on the oil in the two tubes so that like thermal changes in the two cables will produce like oil flows in the two manometric tubes, and freezing the oil in the two cables at corresponding intermediate points, whereby the establishment over a period of time of a drop in level of oil in one manometric tube with respect to the oil level in the other results from and indicates that the oil leak is between the part of the cable connected to the one manometric tube and the place of freezing.

7. The method of locating an oil leak through a fault in the sheath of an oil-filled electric cable having a cable core and a cable oil-feeding tube contiguous with the core subject to the same thermal changes and which can be used as a temperature change comparison device, which method comprises connecting a manometric tube in oil-flow communication with a section of the cable exclusive of the feeding tube, connecting a second manometric tube in oil-flow communication with a corresponding section of the feeding tube, the ratio of the cross-sectional area of the first manometric tube to that of the second manometric tube being the same as the ratio of the thermally caused oil flow in the cable exclusive of the feeding tube to that in the feeding tube, establishing the same oil level in the two manometric tubes and maintaining the same pressure on the oil in the two tubes so that thermal changes in the cable core and feeding tube will produce identical variations in the oil level in the two manometric tubes, freezing the oil in the feeding tube and the oil surrounding the core of the cable at an intermediate point in the cable, whereby the establishment over a period of time of a drop in level of oil in the first manometric tube with respect to the oil level in the second manometric tube indicates that the oil leak is between the part of the cable connected to the one manometric tube and the place of freezing.

8. A method of locating oil leaks even of very small magnitudes occurring through a fault or faults in the sheath of an oil-filled electric cable which is in a system wherein there is means forming an oil-filled member not subject to the same fault or faults and located in such relation to the cable as to be subject to the same thermal variations of the oil in the cable, which method comprises, providing manometric tubes of relative cross-sectional areas of the same ratio as the ratio of the quantities of oil contained in the cable and the member respectively, connecting the manometric tubes in communication respectively with the oil in the impaired cable and with the oil in the member, the connection being such that the ratio of the cross-sectional area of the cable-connected manometric tube to that of the other manometric tube is the same as the ratio of the quantities of oil contained in the cable to the quantity of oil contained in the member so that thermal variations produce identical variations in the oil level in the two manometric tubes, carrying out successive sectionalizing operations by simultaneously freezing of the oil of the cable and the oil of the member at corresponding intermediate points of the cable and the member, and during a part of each sectionalizing operation equalizing the oil levels in the respective manometric tubes so that any subsequent establishment of a differential in the oil levels in the manometric tubes while both the cable and the member remain frozen at an intermediate point indicates and is caused by a leak in the part of the cable sheath between the manometric tubes and the frozen intermediate point, and where there are two or more leaks locating the leaks one after the other beginning from one end of the cable section and moving forward to the other end, locating each leak in sequence and repairing each located leak before proceeding to locate the next leak.

9. A method of locating oil leaks even of very small magnitudes occurring through a fault or faults in the sheath of an oil-filled electric cable which is in a system wherein there is means forming an oil-filled member not subject to the same fault or faults and located in such relation to the cable as to be subject to the same thermal variations of the oil in the cable, which method comprises, providing side by side tubes of relative cross-sectional areas of the same ratio as the ratio of the quantities of oil contained in the cable and the member respectively, connecting the lower ends of the tubes in communication respectively with the oil in the impaired cable and with the oil in the member, the connection being such that the ratio of the cross-sectional area of the cable-connected tube to that of the other tube is the same as the ratio of the quantity of oil contained in the cable to the quantity of oil contained in the member connecting the upper ends of the tubes together, bringing the oil in the two tubes to the same level, maintaining a space filled with gas under pressure separating the oil in one tube from the oil in the other tube and maintaining the pressure on the oil in two tubes equal, so that thermal variations produce identical variations in the oil level in the two tubes, carrying out successive sectionalizing operations by simultaneously freezing of the oil of the cable and the oil of the member at corresponding intermediate points of the cable and the member, and during a part of each sectionalizing operation equalizing the oil levels in the respective tubes so that any subsequent establishment of a differential in the oil levels in the tubes while both the cable and the member remain frozen at an intermediate point indicates and is caused by a leak in the part of the cable sheath between the tubes and the frozen intermediate point.

References Cited in the file of this patent

UNITED STATES PATENTS

| | | |
|---|---|---|
| 1,906,636 | Schlecker | May 2, 1933 |
| 1,944,637 | Emanueli | Jan. 23, 1934 |
| 2,013,138 | De Giers | Sept. 3, 1935 |
| 2,092,560 | Runaldue | Sept. 7, 1937 |
| 2,590,324 | Jones | Mar. 25, 1952 |

FOREIGN PATENTS

| | | |
|---|---|---|
| 319,359 | Great Britain | Nov. 13, 1930 |
| 361,183 | Great Britain | Nov. 19, 1931 |
| 388,265 | Great Britain | Feb. 23, 1933 |
| 421,324 | Great Britain | Dec. 18, 1934 |
| 528,072 | Great Britain | Oct. 22, 1940 |
| 738,587 | Germany | Aug. 21, 1943 |
| 903,829 | Germany | Feb. 11, 1954 |